US012679907B2

(12) United States Patent
Ling et al.

(10) Patent No.: US 12,679,907 B2
(45) Date of Patent: Jul. 14, 2026

(54) CARRIER FOR OLEFIN POLYMERIZATION CATALYST AND APPLICATION THEREOF, CATALYST FOR OLEFIN POLYMERIZATION AND APPLICATION THEREOF, AND OLEFIN POLYMERIZATION METHOD

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Yongtai Ling, Beijing (CN); Junling Zhou, Beijing (CN); Xianzhi Xia, Beijing (CN); Yuexiang Liu, Beijing (CN); Weili Li, Beijing (CN); Tao Liu, Beijing (CN); Chunhong Ren, Beijing (CN); Jin Zhao, Beijing (CN); Futang Gao, Beijing (CN); Long Chen, Beijing (CN); Yang Tan, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 637 days.

(21) Appl. No.: 18/044,188

(22) PCT Filed: Sep. 3, 2021

(86) PCT No.: PCT/CN2021/116417
§ 371 (c)(1),
(2) Date: Mar. 6, 2023

(87) PCT Pub. No.: WO2022/048630
PCT Pub. Date: Mar. 10, 2022

(65) Prior Publication Data
US 2023/0406965 A1 Dec. 21, 2023

(30) Foreign Application Priority Data
Sep. 5, 2020 (CN) ......................... 202010924610.6

(51) Int. Cl.
*C08F 4/02* (2006.01)
*B01J 31/38* (2006.01)
*C08F 4/00* (2006.01)

(52) U.S. Cl.
CPC .............. *C08F 4/022* (2013.01); *C08F 4/005* (2013.01); *B01J 31/38* (2013.01); *C08F 2410/06* (2021.01)

(58) Field of Classification Search
CPC ..... B01J 3/38; B01J 31/38; C08F 4/02; C08F 4/022; C08F 4/614
See application file for complete search history.

(56) References Cited

U.S. PATENT DOCUMENTS 6,020,279 A 2/2000 Uwai et al.
9,809,663 B2 * 11/2017 Xia ......................... C08F 10/06
(Continued)

FOREIGN PATENT DOCUMENTS

CN 1330086 A 1/2002
CN 1397568 A 2/2003
(Continued)

OTHER PUBLICATIONS

Chen, Liyi et al.; "Controllable Formation of MgCl2-based Spherical Catalyst Support Precursors via Composites of Liquid Inorganics and Polymers"; Zeitschrift Fur Naturforschung Section B—A Journal of Chemical Sciences; vol. 64, No. 5; Dec. 31, 2018; pp. 509-516.
(Continued)

*Primary Examiner* — Rip A Lee
(74) *Attorney, Agent, or Firm* — NKL Law; Allen Xue

(57) ABSTRACT

A spherical carrier for olefin polymerization catalysts has at least one magnesium-containing compound having a structure represented by formula (1). The spherical carrier has a relatively good particle morphology, and substantially no abnormally morphological particles will appear. A method for preparing the spherical carrier can be used to prepare a carrier having a small particle size and greatly expands the
(Continued)

particle size range of the preparable carrier. When the catalyst prepared by using the carrier is used for olefin polymerization, polymerization activity is good, substantially no abnormally morphological material is present, and hydrogen response is good.

Formula (1)

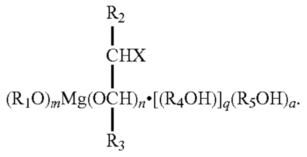

12 Claims, 1 Drawing Sheet

(56) References Cited

U.S. PATENT DOCUMENTS

| | | | | |
|---|---|---|---|---|
| 9,951,157 | B2 * | 4/2018 | Li | C08F 10/06 |
| 2004/0229748 | A1 | 11/2004 | Chen et al. | |

FOREIGN PATENT DOCUMENTS

| | | | | | |
|---|---|---|---|---|---|
| CN | 1463990 | A | | 12/2003 | |
| CN | 1563112 | A | | 1/2005 | |
| CN | 1580136 | A | | 2/2005 | |
| CN | 1958622 | A | | 5/2007 | |
| CN | 102040680 | A | * | 5/2011 | C08F 10/00 |
| CN | 102040683 | A | | 5/2011 | |
| CN | 102040685 | A | | 5/2011 | |
| CN | 102286120 | A | | 12/2011 | |
| CN | 102432716 | A | | 5/2012 | |
| CN | 102124036 | B | | 8/2013 | |
| CN | 102040680 | B | | 9/2013 | |
| CN | 103788248 | A | | 5/2014 | |
| CN | 103880990 | A | | 6/2014 | |
| CN | 105440176 | A | * | 3/2016 | C08F 10/00 |
| CN | 106478850 | A | | 3/2017 | |
| CN | 106543299 | A | | 3/2017 | |
| CN | 105440176 | B | | 8/2017 | |
| CN | 107915794 | A | * | 4/2018 | C08F 10/00 |
| CN | 109206541 | A | | 1/2019 | |
| CN | 109206546 | A | | 1/2019 | |
| CN | 109678989 | A | | 4/2019 | |
| CN | 109694423 | A | | 4/2019 | |
| CN | 111072797 | A | | 4/2020 | |
| CN | 111072803 | A | | 4/2020 | |
| CN | 111100218 | A | | 5/2020 | |
| CN | 111138574 | A | | 5/2020 | |
| CN | 114149518 | A | | 3/2022 | |
| EP | 0273695 | A1 | | 7/1988 | |
| EP | 0319226 | A2 | | 6/1989 | |
| EP | 0395083 | A2 | | 10/1990 | |
| IN | 201637014561 | A | | 8/2016 | |
| JP | H0649119 | A | | 2/1994 | |
| JP | 2016540065 | A | | 12/2016 | |
| JP | 2022504961 | A | | 1/2022 | |
| RU | 2005128272 | A | | 8/2006 | |
| RU | 2348638 | C2 | | 3/2009 | |

OTHER PUBLICATIONS

Ling, Yongtai ; "Effect of reaction byproducts on HQ Support"; Petrochemical Industry Technology; vol. 3; Dec. 31, 2018; pp. 1-3.

* cited by examiner

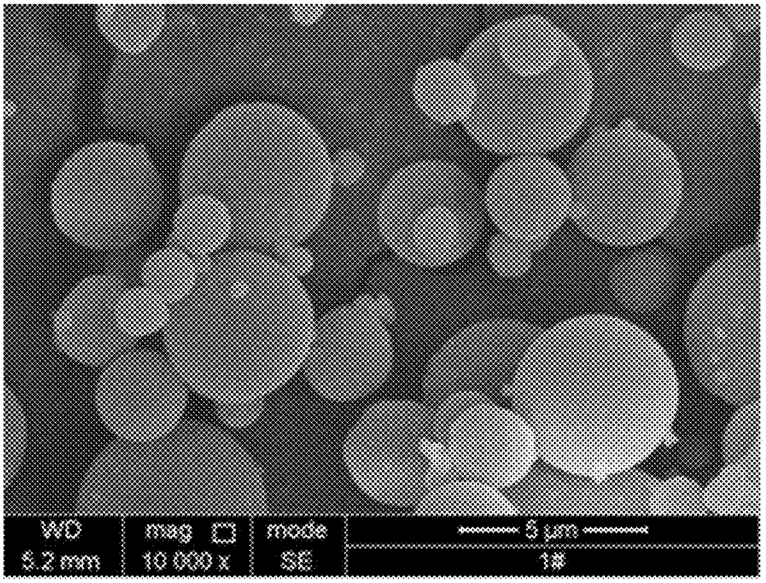
WD
5.2 mm
mag
10 000 x
mode
SE
5 μm
1#

CARRIER FOR OLEFIN POLYMERIZATION CATALYST AND APPLICATION THEREOF, CATALYST FOR OLEFIN POLYMERIZATION AND APPLICATION THEREOF, AND OLEFIN POLYMERIZATION METHOD

TECHNICAL FIELD

The present invention relates to the field of olefin polymerization catalyst, specifically to a spherical carrier for olefin polymerization catalysts, a method for preparing the same, the spherical carrier prepared through the method, use of the spherical carrier in the preparation of catalysts for olefin polymerization, a catalyst containing the spherical carrier, and use of the catalyst for catalyzing olefin polymerization.

BACKGROUND ART

When used in olefin polymerizations, Ziegler-Natta catalysts prepared from magnesium dichloride-alcohol adducts, especially those prepared from spherical magnesium dichloride-alcohol adducts, exhibit generally catalyst performance significantly better than that of catalysts supported on other carriers. Therefore, most of the current catalysts for olefin polymerization are prepared by supporting a titanium halide on a magnesium dichloride-alcohol adduct.

However, when the catalysts prepared from the magnesium dichloride-alcohol adduct are used in olefin polymerization, the polymer particles are easily broken during the polymerization, resulting in a large amount of polymer fines.

In order to overcome this shortcoming, it has been attempted to introduce in advance an electron donor compound into the preparation of the magnesium dichloride-alcohol adduct carrier. For instance, CN1397568A and CN1563112A teach the introduction of a phthalate compound as an internal electron donor into the synthesis of a magnesium dichloride-alcohol adduct carrier to obtain a "magnesium dichloride-alcohol-phthalate" spherical carrier, which is then reacted with titanium tetrachloride to form a catalyst. However, the composite spherical carrier tends to be sticky during the preparation, and it is difficult to form spherical particles with suitable particle size.

In addition, most of the above-mentioned magnesium dichloride-alcohol adducts are prepared by cryogenically quenching and solidifying a high temperature alcohol adduct melt. Not only does such a technology consume a large amount of energy and involve in a complicated preparation process requiring multiple reactors in combination, but also the particle size distribution of the prepared alcohol adduct is relatively wide.

In order to solve this problem, CN102040683A discloses a method for preparing a carrier by reacting a magnesium halide-alcohol adduct with an oxirane-type compound. However, preparing a catalyst carrier by using this method often requires the addition of a surfactant, and this method has shortcomings of unstable preparation process, ease of carrier agglomeration, and bad carrier formation.

Therefore, there is still a need to develop a new method for preparing a carrier useful in catalysts for olefin polymerization.

DISCLOSURES OF THE INVENTION

The purpose of the present invention is to overcome the defects suffered by the prior art that the olefin polymerization catalyst carrier has poor particle morphology, a carrier having a small particle size cannot be prepared, and when used in olefin polymerization the catalyst prepared from the carrier exhibits a poor hydrogen response.

The inventors have unexpectedly found that a catalyst carrier with a novel composition and a good particle morphology can be obtained by adding an alcohol compound and a halogenated alcohol compound in the preparation of the catalyst carrier to form a fluidized mixture and then spray drying. So obtained catalyst carrier has substantially no abnormally morphological particles; a carrier with a very small particle size can be prepared so that the particle size range of the preparable carrier is expended; the carrier can be directly synthesized without using a surfactant and without using an inert solvent during the preparation, with the preparation process being stable; further, when the catalyst prepared from the carrier is used in olefin polymerization, the sensitivity to hydrogen modulation is high. Based on the above findings, the inventors have made the present inventions.

An object of the present invention is to provide a spherical carrier of catalysts for olefin polymerization, comprising at least one magnesium-containing compound having a structure represented by Formula (1):

Formula (1)

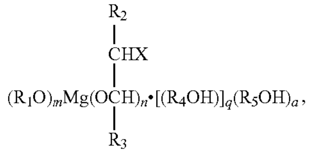

wherein, $R_1$ is a $C_{1-10}$ alkyl;

$R_2$ and $R_3$ are, each independently, selected from the group consisting of H, $C_{1-10}$ alkyl groups and $C_{1-10}$ alkyl groups substituted by 1 to 10 halogen atoms;

$R_4$ is selected from the group consisting of $C_{1-10}$ alkyl groups substituted by at least one halogen atom and $C_{6-20}$ aryl groups substituted by at least one halogen atom;

$R_5$ is a $C_{1-5}$ alkyl;

X is selected from the group consisting of fluorine, chlorine, bromine and iodine;

m is 0.1 to 1.9, n is 0.1 to 1.9, and m+n=2; $0<q<0.2$; $0<a<0.1$.

A further object of the present invention is to provide a method for preparing the spherical carrier of catalysts for olefin polymerization, comprising:

(1) subjecting materials of component A to a first contact and then applying shear force on the resulting mixture to afford a first product, the component A comprising a magnesium halide of the general formula MgXY and a first alcohol of the general formula $R_1OH$;

(2) subjecting the first product and component B to a second contact to afford a second product, the component B comprising an oxirane-type compound having a structure represented by Formula (2);

(3) subjecting the second product and component C to a third contact to afford a third product, the component C comprising a halogenated alcohol of the general formula $R_4OH$ and a second alcohol of the general formula $R_5OH$;

(4) spray drying the third product;

Formula (2)

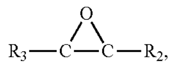

wherein, in the formula $R_1OH$, $R_1$ is a $C_{1-10}$ alkyl;

in the formula (2), $R_2$ and $R_3$ are, each independently, selected from the group consisting of H, $C_{1-10}$ alkyl groups unsubstituted or substituted by 1 to 10 halogen atoms;

in the formula $R_4OH$, $R_4$ is selected from the group consisting of $C_{1-10}$ alkyl groups substituted by at least one halogen atom and $C_{6-20}$ aryl groups substituted by at least one halogen atom;

in the formula $R_5OH$, $R_5$ is a $C_{1-5}$ alkyl;

in the formula MgXY, X is selected from the group consisting of fluorine, chlorine, bromine and iodine; Y is selected from the group consisting of fluorine, chlorine, bromine, iodine, $C_{1-6}$ alkyl, $C_{1-6}$ alkoxy, $C_{6-14}$ aryl and $C_{6-14}$ aryloxy;

the amounts of the component A, the component B and the component C used are such that the resulting spherical carrier comprises a magnesium-containing compound having a structure represented by Formula (1):

Formula (1)

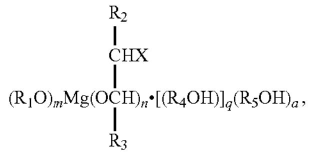

wherein, m is 0.1 to 1.9, n is 0.1 to 1.9, and m+n=2; 0<q<0.2; 0<a<0.1; and wherein, in step (3), relative to 1 mole of the magnesium halide, the amount of the halogenated alcohol used is from 0.05 to 6.5 mol, and the amount of the second alcohol used is from 5 to 100 mol.

A further object of the present invention is to provide a spherical carrier prepared by the above-described method.

A further object of the present invention is to provide the use of the spherical carrier in the preparation of a catalyst for olefin polymerization.

A still further object of the present invention is to provide a catalyst comprising the above-described spherical carrier.

A still further object of the present invention is to provide the use of the above-described catalyst for catalyzing olefin polymerization.

Compared to the prior art, the present invention has at least the following advantages:

(1) the spherical carrier of catalysts for olefin polymerization provided by the present invention has a good particle morphology and substantially no abnormally morphological particles; the method provided by the present invention does not need to add a surfactant and a solvent, has a stable preparation process, and is capable of preparing carriers with very small particle size so that the particle size range of the preparable carrier is greatly expanded;

(2) when used in olefin polymerization, such as propylene polymerization, the catalyst prepared from the spherical carrier has a high polymerization activity and a good hydrogen response, exhibiting a promising industrial application prospect.

Other features and advantages of the present invention will be described in detail in the detailed description that follows.

BRIEF DESCRIPTION OF DRAWINGS

The FIGURE is an electron micrograph of the spherical carrier from Example 1.

DESCRIPTION OF PREFERRED EMBODIMENTS

The endpoints of ranges and any values disclosed herein are not limited to the precise ranges or values, and these ranges or values should be understood as including values close to these ranges or values. For numerical ranges, the end values of individual ranges, the end values of individual ranges and the individual point values therebetween, and the individual point values can be combined with each other to obtain one or more new numerical ranges, which should be considered as being specifically disclosed herein.

As used herein, the term "alkyl" refers to a paraffinic hydrocarbon group, which may be linear, branched, or cyclic, and which can be derived from an alkane by removing one or more hydrogens from its chemical formula. Examples of alkyl groups include, but are not limited to, methyl, ethyl, n-propyl, isopropyl, cyclopropyl, n-butyl, sec-butyl, isobutyl, tert-butyl, cyclobutyl, n-pentyl, isopentyl, neopentyl, cyclopentyl, n-hexyl, isohexyl, cyclohexyl, 1-ethylpropyl, 2-methylbutyl, 3-methylbutyl, 2,2-dimethylpropyl, and the like.

As used herein, the term "aryl" refers to an aromatic hydrocarbon group, which can be derived from an aromatic hydrocarbon by removing one or more hydrogens from its chemical formula. Examples of aryl groups include, but are not limited to, phenyl, o-tolyl, m-tolyl, p-tolyl, o-ethylphenyl, m-ethylphenyl, p-ethylphenyl, naphthyl, benzyl, phenethyl, and the like.

As used herein, the term "halogen" refers to fluorine, chlorine, bromine or iodine.

As used herein, the term "$C_{1-10}$ alkyl substituted by 1 to 10 halogen atoms" refers to a group formed by substituting 1 to 10 hydrogen atoms of the $C_{1-10}$ alkyl with halogen atom(s). It is possible that multiple hydrogen atoms on the same carbon atom are substituted by halogen atoms, or that hydrogen atoms on different carbon atoms are substituted by halogen atoms. When the substitution of multiple halogen atoms occurs, the halogen atoms can be the same or different. Examples include, but are not limited to, $-CF_3$, $-CH_2CF_3$, $-CH_2CF_2H$, $-CF_2CF_3$, $-CF_2CH_2CF_2H$, $-CH_2CF_2CF_2H$, $-CH_2CH_2CH_2Cl$, $-CH_2CH_2CH_2Br$, and the like.

Similarly, the terms "$C_{1-10}$ alkyl substituted by at least one (or at least two) halogen atom" and "$C_{6-20}$ aryl substituted by at least one (or at least two) halogen atom" as used herein refer to a group formed by substituting at least one (or at least two) hydrogen atom of the $C_{1-10}$ alkyl and the $C_{6-20}$ aryl with halogen atom, respectively. In the case where multiple hydrogen atoms are substituted by halogen atoms, the hydrogen atoms may be ones on the same carbon atom or on different carbon atoms, and the halogen atoms may be the same or different. Examples of $C_{1-10}$ alkyl substituted by at least one halogen atom include, but are not limited to, $CF_3$, $—CH_2CF_3$, $—CH_2CF_2H$, $—CF_2CF_3$, $—CF_2CH_2CF_2H$, $—CH_2CF_2CF_2H$, $—CH_2CH_2CH_2Cl$, $—CH_2CH_2CH_2Br$ and the like. Examples of $C_{6-20}$ aryl substituted by at least one halogen atom include, but are not limited to, 2-, 3- or 4-chlorophenyl, 2-, 3- or 4-bromophenyl, 2,3-, 2,4-, 2,5-, 2,6-, 3,4- or 3,5-dichlorophenyl, 2,3-, 2,4-, 2,5-, 2,6-, 3,4- or 3,5-dibromophenyl, 4-trifluoromethylphenyl.

As stated above, in a first aspect, the present invention provides a spherical carrier of catalysts for olefin polymerization, comprising at least one magnesium-containing compound having a structure represented by Formula (1):

Formula (1)

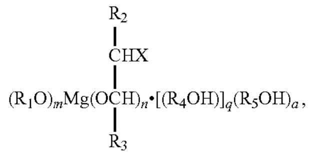

wherein, $R_1$ is a linear, branched or cyclic $C_{1-10}$ alkyl;

$R_2$ and $R_3$ are, each independently, selected from the group consisting of H, linear or branched $C_{1-10}$ alkyl groups, and linear or branched $C_{1-10}$ alkyl groups substituted by 1 to 10 halogen atoms;

$R_4$ is selected from the group consisting of linear, branched or cyclic $C_{1-10}$ alkyl groups substituted by at least one halogen atom and $C_{6-20}$ aryl groups substituted by at least one halogen atom;

$R_5$ is a $C_{1-5}$ alkyl;

X is selected from the group consisting of fluorine, chlorine, bromine and iodine;

m is 0.1 to 1.9, n is 0.1 to 1.9, and m+n=2; $0<q<0.2$; $0<a<0.1$.

In some embodiments, the carrier of the present invention consists essentially of the at least one magnesium-containing compound having the structure represented by the formula (1).

In some embodiments, the carrier of the present invention consists of the at least one magnesium-containing compound having the structure represented by the formula (1).

Preferably, $R_1$ is a linear, branched or cyclic $C_{1-8}$ alkyl; and more preferably, $R_1$ is a linear, branched or cyclic $C_{1-6}$ alkyl.

Preferably, $R_2$ and $R_3$ are, each independently, selected from the group consisting of H, linear or branched $C_{1-5}$ alkyl, and linear or branched $C_{1-5}$ alkyl substituted by 1 to 10 halogen atoms.

Preferably, $R_4$ is selected from the group consisting of linear, branched or cyclic $C_{1-10}$ alkyl groups substituted by at least two halogen atoms and $C_{6-20}$ aryl groups substituted by at least two halogen atoms, with the halogen atom being preferably at least one selected from the group consisting of chlorine atom, bromine atom and iodine atom.

Preferably, $R_5$ is a $C_{1-2}$ alkyl.

Preferably, X is selected from the group consisting of chlorine and bromine.

Preferably, m is from 0.3 to 1.7, more preferably from 0.6 to 1.4, and even more preferably from 0.8 to 1.2.

Preferably, n is from 0.3 to 1.7, more preferably from 0.6 to 1.4, and even more preferably from 0.8 to 1.2.

Preferably, $0.001<q<0.15$.

Preferably, $0.001<a<0.08$.

Preferably, the spherical carrier has an average particle size of from 2 to 100 microns and a particle size distribution less than 2, and more preferably, the spherical carrier has an average particle size of from 2 to 19 microns and a particle size distribution of from 0.6 to 1.6.

In order to be capable of obtaining an olefin polymer with a higher bulk density when the catalyst prepared from the spherical carrier is used for olefin polymerization, it is further preferred that the spherical carrier has an average particle size of from 2 to 10 microns and a particle size distribution of from 0.6 to 1.

In the present invention, the average particle size refers to D50.

In the present invention, the value of the particle size distribution is defined as (D90−D10)/D50.

In the present invention, the average particle size and the particle size distribution of the catalyst carrier are measured by using a laser particle sizer such as Master Sizer 2000 laser particle sizer (manufactured by Malvern Instruments Ltd.). In the measurement, hexane can be used as an inert dispersion medium, for example.

As mentioned above, in a second aspect, the present invention provides a method for preparing the spherical carrier of catalysts for olefin polymerization, comprising:

(1) subjecting the materials of component A to a first contact and then applying shear force on the resulting mixture to afford a first product, the component A comprising a magnesium halide of the general formula MgXY and a first alcohol of the general formula $R_1OH$;

(2) subjecting the first product and component B to a second contact to afford a second product, the component B comprising an oxirane-type compound having a structure represented by Formula (2);

(3) subjecting the second product and component C to a third contact to afford a third product, the component C comprising a halogenated alcohol of the general formula $R_4OH$ and a second alcohol of the general formula $R_5OH$;

(4) spray drying the third product;

Formula (2)

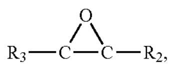

wherein, in the formula $R_1OH$, $R_1$ is a linear, branched or cyclic $C_{1-10}$ alkyl;

in the formula (2), $R_2$ and $R_3$ are, each independently, selected from the group consisting of H, linear or branched $C_{1-10}$ alkyl groups unsubstituted or substituted by 1 to 10 halogen atoms;

in the formula $R_4OH$, $R_4$ is selected from the group consisting of linear, branched or cyclic $C_{1-10}$ alkyl groups substituted by at least one halogen atom and $C_{6-20}$ aryl groups substituted by at least one halogen atom;

in the formula $R_5OH$, $R_5$ is a $C_{1-5}$ alkyl;

in the formula MgXY, X is selected from the group consisting of fluorine, chlorine, bromine and iodine; Y is selected from the group consisting of fluorine, chlorine, bromine, iodine, linear or branched $C_{1-6}$ alkyl, linear or branched $C_{1-6}$ alkoxy, $C_{6-14}$ aryl and $C_{6-14}$ aryloxy;

the amounts of the component A, the component B and the component C used are such that the resulting spherical carrier comprises, consists substantially of, or consists of a magnesium-containing compound having a structure represented by Formula (1):

Formula (1)

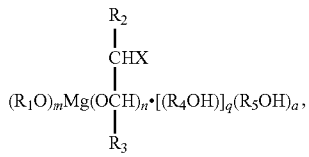

wherein, $R_1$-$R_5$ and X are as defined above, m is 0.1 to 1.9, n is 0.1 to 1.9, and m+n=2; 0<q<0.2; 0<a<0.1; and wherein, in step (3), relative to 1 mole of the magnesium halide, the amount of the halogenated alcohol used is from 0.05 to 6.5 mol, and the amount of the second alcohol used is from 5 to 100 mol.

In the second aspect of the present invention, the definitions and preferences of $R_1$, $R_2$, $R_3$, $R_4$ and $R_5$ groups are the same as those defined in the first aspect of the present invention.

According to a preferred embodiment of the present invention, in the formula MgXY, X is selected from the group consisting of chlorine and bromine, Y is selected from the group consisting of chlorine, bromine, linear or branched $C_{1-5}$ alkyl, linear or branched $C_{1-5}$ alkoxy, $C_{6-10}$ aryl and $C_{6-10}$ aryloxy.

More preferably, the magnesium halide is at least one selected from the group consisting of magnesium chloride, magnesium bromide, phenoxymagnesium chloride, isopropoxymagnesium chloride and n-butoxymagnesium chloride, more preferably magnesium chloride.

According to another preferred embodiment of the present invention, in the formula $R_1OH$, $R_1$ is a linear, branched or cyclic $C_{1-8}$ alkyl group.

More preferably, the first alcohol compound is at least one selected from the group consisting of ethanol, propanol, isopropanol, n-butanol, isobutanol, pentanol, isopentanol, n-hexanol, n-octanol and 2-ethylhexanol.

According to another preferred embodiment of the present invention, in the formula (2), $R_2$ and $R_3$ are, each independently, selected from the group consisting of H, linear or branched $C_{1-5}$ alkyl, and linear or branched $C_{1-5}$ alkyl substituted by 1 to 10 halogen atoms.

More preferably, the oxirane-type compound is at least one selected from the group consisting of ethylene oxide, propylene oxide, butylene oxide, epichlorohydrin, epoxy chlorobutane, epoxy bromopropane, and epoxy bromobutane.

According to some embodiments of the present invention, the halogenated alcohol may be a monohalogenated alcohol or a polyhalogenated alcohol, preferably a chlorohydrin, a bromohydrin or an iodohydrin, such as 2,2,2-trichloroethanol, 2,2-dichloroethanol, 2-chloroethanol, 3-chloro-1-propanol, 6-chloro-1-hexanol, 3-bromo-1-propanol, 5-chloro-1-pentanol, 4-chloro-1-butanol, 2-chlorocyclohexanol, 1,2-dichloroethanol, 1,3-dichloropropanol, 1,4-dichlorobutanol or 2-iodoethanol, etc.

According to a preferred embodiment of the present invention, in the formula $R_4OH$, $R_4$ is selected from the group consisting of linear, branched or cyclic $C_{1-10}$ alkyls substituted by at least two halogen atoms and $C_{6-20}$ aryl substituted by at least two halogen atoms, with the halogen atoms being at least one selected from the group consisting of chlorine atom, bromine atom and iodine atom.

Preferably, the halogenated alcohol is at least one selected from the group consisting of 2,2,2-trichloroethanol, 2,2-dichloroethanol, 1,2-dichloroethanol, 1,3-dichloropropanol, 1,4-dichlorobutanol.

According to the present invention, the second alcohol compound is at least one of $C_{1-5}$ alcohol compounds, such as ethanol, methanol, n-propanol, isopropanol, n-butanol or isobutanol. According to a preferred embodiment of the present invention, in the formula $R_5OH$, $R_5$ is a $C_{1-2}$ alkyl, that is, the second alcohol compound is methanol and/or ethanol.

The inventers have found that when the amounts of the halogenated alcohol compound and the alcohol compounds are too large, the resultant catalyst carrier will be sticky and become agglomerated so that subsequent operations cannot be performed.

In the method disclosed herein, relative to 1 mole of the magnesium halide, the amount of the first alcohol compound is from 1 to 30 moles, the amount of the oxirane-type compound is from 1 to 10 moles, the amount of the halogenated alcohol is from 0.05 to 6.5 moles, and the amount of the second alcohol compound is from 5 to 100 moles.

Preferably, relative to 1 mole of the magnesium halide, the amount of the first alcohol compound is from 6 to 22 moles, the amount of the oxirane-type compound is from 2 to 6 moles, the amount of the halogenated alcohol is from 1 to 5 moles, and the amount of the second alcohol compound is from 8 to 80 moles, and more preferably from 31 to 50 moles.

It should be noted that the trace amount of water contained in the above-mentioned reactants will also participate in the reaction of forming the spherical carrier. Therefore, the prepared spherical carrier may contain a trace amount of water from the reaction raw materials and the reaction medium, which should not be construed as a limitation of the present invention by those skilled in the art.

Preferably, in step (1), the first contact is performed under stirring, and the conditions for the first contact include a temperature of from 40 to 130° C., preferably from 50 to 130° C., and more preferably from 80 to 120° C., and a time of from 0.3 to 24 hours, preferably from 0.5 to 10 hours, and more preferably from 0.5 to 5 hours.

More preferably, in step (1), the conditions for the first contact include a temperature of from 80 to 100° C. and a time of from 0.5 to 3 hours.

In step (1), there is not a particular limitation on the specific manner for applying the shear force, which can be performed by a method known by those skilled in the art. For example, it is carried out with low-speed shearing or high-speed shearing. Preferably, when the low-speed shearing is used, the stirring rate of the low-speed shearing is 400 to 800 rpm. The high-speed shearing method is well known to those skilled in the art, and can be performed by using, for example, the high stirring speed disclosed in CN1330086A. In addition, the operation of applying shear force can also be performed according to the following methods disclosed in patent applications: the method disclosed in CN1580136A, wherein a solution containing a liquid magnesium halide compound is dispersed via rotation in a supergravity bed (the speed of rotation is 100 to 3000 rpm); another method disclosed in CN1463990A, wherein a solution containing a liquid magnesium halide adduct is output from an emulsifier at a speed of 1500 to 8000 rpm; another method disclosed in U.S. Pat. No. 6,020,279A, wherein shear force is applied through a spraying process on a solution containing a liquid magnesium halide adduct.

Preferably, in step (2), the conditions for the second contact includes a temperature of from 30 to 130° C., and preferably from 50 to 120° C., and a time of from 10 to 180 min, and preferably from 20 to 60 min.

More preferably, in step (2), the conditions for the second contact include a temperature of from 80 to 100° C. and a time of from 20 to 50 min.

According to a preferred embodiment of the present invention, step (3) further comprises washing the second product with an inert solvent prior to the third contact of it with individual components of component C, with the inert solvent being preferably at least one selected from pentane, hexane, heptane, petroleum ether and gasoline.

According to the present invention, the specific conditions for the third contact in step (3) are not particularly limited, as long as the component C and the second product can be brought into full contact to form a fluid. However, in order to obtain a catalyst carrier with better performance, the conditions for the third contact in step (3) include preferably under stirring, a temperature of from 0 to 120° C., and a time of from 0.5 to 6 hours.

The specific manner of the third contact in step (3) is not particularly limited in the present invention, and the halogenated alcohol and the second alcohol compound can be mixed and contacted with the second component, simultaneously or successively in any order.

In the present invention, the conditions for the spray drying may be those known conditions capable of forming an olefin polymerization catalyst carrier. According to a preferred embodiment of the present invention, the spray drying is carried out in a sprayer having an atomizing nozzle, the atomizing nozzle comprising a material conduit and a nozzle head, wherein the third product is introduced through the material conduit into the nozzle head and then sprayed into a tower body of the sprayer containing an inert medium to accomplish evaporation and solidification. Preferably, the temperature of the third product in the material conduit is between 0° C. and 80° C., and the temperature of the third product in the nozzle head is from 80° C. to 180° C., and more preferably from 120° C. to 180° C.

In the present invention, in step (4), the conditions for the spray drying include preferably a temperature of from 60 to 200° C., and more preferably from 90 to 150° C. In the present invention, the temperature for the spray drying refers to the temperature of the inert medium in the sprayer.

In the present invention, the inert medium may include a protective gas medium and/or an inert liquid medium. The type of the protective gas medium is not particularly limited. For example, it may be nitrogen, or an inert gas medium such as helium, or other suitable gases such as carbon dioxide, etc. The inert liquid medium is a variety of liquid media commonly used in the art that do not chemically interact with reactants and reaction products. Preferably, the inert liquid medium is a silicone oil and/or an inert liquid hydrocarbon solvent. More preferably, the inert liquid medium is at least one selected from kerosene, paraffin oil, vaseline oil, white oil, methyl silicone oil, ethyl silicone oil, methyl ethyl silicone oil, phenyl silicone oil and methyl phenyl silicone oil, and more preferably white oil.

In the present invention, the amount of the inert liquid medium used in the sprayer may be selected according to the amount of the magnesium halide of formula MgXY, and ranges preferably from 0.8 to 10 L per mole of the magnesium halide, and more preferably from 2 to 8 L per mole of the magnesium halide.

The method described in the second aspect of the present invention also includes conventional post-treatment means in the art such as solid-liquid separation, washing, drying, and the like, which are not particularly limited in the present invention. The solid-liquid separation can be accomplished by using various existing methods that can realize the separation of a solid phase from a liquid phase, such as suction filtration, pressure filtration, centrifugal separation, and the like. Preferably, the solid-liquid separation is accomplished by a pressure filtration method. There is not a particular limitation to the conditions for the pressure filtration in the present invention, as long as the separation of the solid phase and the liquid phase is realized as fully as possible. The washing can be accomplished by a method known by those skilled in the art, to wash the obtained solid product. For example, the obtained solid product can be washed with an inert hydrocarbon solvent such as pentane, hexane, heptane, petroleum ether and gasoline. The specific conditions for the drying are not particularly limited in the present invention. For example, the drying temperature can be 20 to 70° C., the drying time can be 0.5 to 10 h, and the drying can be carried out under normal pressure or reduced pressure.

The inventers have found that by using specific types and amounts of alcohol compounds and halogenated alcohol compounds in combination with components such as magnesium halides and oxirane-type compounds, together with the spray drying, a catalyst carrier having a novel composition, a good particle morphology and substantially no abnormally morphological particles can be obtained, while no surfactant is required to be added in the preparation process and the preparation process is stable.

In particular, the method provided by the present invention can prepare a carrier with a very small particle size, thereby greatly expanding the particle size range of the preparable carrier; and when used in olefin polymerization, the catalyst prepared from the carrier has a relatively good hydrogen response.

As stated above, in a third aspect, the present invention provides a spherical carrier prepared by the method described above in the second aspect.

The inventers have found that the spherical carrier for catalysts prepared by the method of the present invention has a good particle morphology and basically does not have abnormally morphological particles.

As stated above, in a fourth aspect, the present invention provides use of the spherical carrier described in the first aspect or the third aspect in the preparation of a catalyst for olefin polymerization.

As stated above, in a fifth aspect, the present invention provides a catalyst comprising the spherical carrier described in the first aspect or the third aspect.

Methods for preparing catalysts for olefin polymerization from the spherical carrier and so-obtained catalysts are known to those skilled in the art. In the present invention, the composition of the catalyst is not particularly limited, and can be a composition of an existing catalyst for olefin polymerization in the art. However, in order to obtain a catalyst suitable for olefin polymerization, especially propylene polymerization, it is preferred that the catalyst comprises the carrier, a titanium halide compound, and an electron donor compound. Preferably, the titanium halide is at least one selected from the group consisting of titanium tetrachloride, titanium tetrabromide, titanium tetraiodide, tetra-n-butoxy titanium, tetraethoxy titanium, tri-n-butoxy titanium chloride, di-n-butoxy titanium dichloride, n-butoxy titanium trichloride, triethoxy titanium chloride, diethoxytitanium dichloride, ethoxy titanium trichloride, and titanium trichloride. Preferably, the electron donor compound is at least one selected from the group consisting of esters of phthalic acid such as diisobutyl phthalate, diol esters of carboxylic acids, esters of phosphoric acid, ethers such as 1,3-diethers. Furthermore, the contents of individual components in the catalyst are not particularly limited in the present invention, and those skilled in the art would be able to make reasonable adjustment and design according to actual needs.

The preparation method of the catalyst is not particularly limited in the present invention, and a conventional method for preparing an olefin polymerization catalyst in the art can be used. In an embodiment, an olefin polymerization catalyst is prepared by treating the spherical carrier with a titanium halide compound in an optional inert liquid medium, optionally prior to, during or after the treatment, an internal electron donor compound is introduced into the carrier. A specific operation process is set forth hereinbelow in the examples, and those skilled in the art should not interpret it as a limitation to the present invention.

As stated above, in a sixth aspect, the present invention provides the use of the catalyst described above in the fifth aspect in catalyzing an olefin polymerization reaction.

The specific operation of the use is not particularly limited in the present invention, and those skilled in the art may operate according to a conventional method for performing an olefin polymerization in the art, which is not described in detail herein. A specific operation process is set forth hereinbelow, and those skilled in the art should not interpret it as a limitation to the present invention.

Thus, in an embodiment, the present invention provides a process for olefin polymerization, comprising contacting at least one C2-C10 olefin monomer and optionally a comonomer with the catalyst under polymerizable conditions to form an olefin polymer, and recovering the olefin polymer.

The inventers have found that when the catalyst prepared from the spherical carrier provided by the present invention is used in olefin polymerization, especially propylene polymerization, it has a high polymerization activity, gives rise to substantially no abnormally morphological particles, and exhibits a hydrogen response significantly better than that achieved by the prior art, exhibiting a promising industrial application prospect.

The present invention will be described in detail below by way of examples.

In the following examples, unless specified otherwise, the raw materials are commercially available and used as received.

1,3-Dichloropropanol was purchased from J & K Scientific Co.;

Epichlorohydrin was purchased from J & K Scientific Co.;

Di-isobutyl phthalate was purchased from J & K Scientific Co.;

Titanium tetrachloride was purchased from J & K Scientific Co.;

Triethyl aluminum was purchased from J & K Scientific Co.;

Methylcyclohexyldimethoxysilane was purchased from J & K Scientific Co.

In the following examples, the properties involved are determined through the following test methods:

1. The average particle size and particle size distribution of the catalyst carrier: measured on Masters Sizer Model 2000 particle sizer manufactured by Malvern Instruments Co., Ltd., with hexane being used as a dispersion medium;
2. The morphology of the catalyst carrier: observed by XL-30 Field Emission Electron Microscope produced by FEI Company, USA;
3. The structure and composition of the catalyst carrier: $^1$H NMR spectrum of the carrier is acquired on AVANCE 300 nuclear magnetic resonance spectrometer from Bruker Company, Switzerland, and the composition of the carrier is determined by using PY-2020iD cracker from Fronteerlab Company, TraceGC Ultra chromatograph and DSQ model II mass spectrometer from Thermo Fisher Company;
4. Catalyst activity: evaluated by the ratio of the weight of the product obtained after polymerization to the weight of the catalyst;
5. The bulk density of the polyolefin powder: determined by using the procedure specified by GB/T 1636-2008;
6. Melt flow rate of polyolefin powder: measured according to ISO 1133, @230° C. under 2.16 kg load.

In the following examples, unless specified otherwise, the application of shear force during the preparation of the catalyst carrier is carried out by stirring at 600 rpm.

Example 1

(1) To a 0.6 L reaction kettle, 0.08 mol of magnesium dichloride and 1.7 mol of ethanol (the first alcohol compound) were added, the temperature was raised to 90° C. with stirring, and the contents was allowed to react at that constant temperature for 1 h to carry out a first contact, and then shear force was applied to the resulting mixture to afford a first product.

(2) The first product was subjected to a second contact with 0.48 mol of epichlorohydrin to afford a second product, with the conditions for the second contact including a temperature of 90° C. and a time of 30 minute.

(3) After pressure filtration of the second product, the obtained solids were subjected to a third contact by fully mixing and stirring with 2.5 mol of ethanol (the second alcohol compound) and 0.35 mol of 1,3-dichloropropanol (halogenated alcohol) to form a fluid, thereby affording a third product.

(4) With a sprayer B-290 comprising a nozzle head and a material conduit, the third product was sprayed into the circulating nitrogen at 100° C. in the sprayer tower for spray drying to afford a spherical carrier Z1, with the temperature of the third product in the material conduit being 15° C., and the temperature of the third product in the nozzle head being 120° C.

After testing, the structure and composition of the obtained catalyst spherical carrier Z1 were found as being:

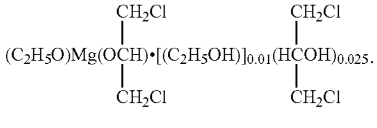

The average particle size (D50) of the catalyst spherical carrier Z1 was tested as 4 microns, and the particle size distribution ((D90–D10)/D50) was tested as 0.9.

The FIGURE shows a micrograph of the spherical carrier Z1. It can be seen from the FIGURE that the particles of the catalyst spherical carrier Z1 are relatively regular in shape and smooth in surface, substantially all of them are of sphere shape, and the catalyst spherical carrier Z1 is relatively concentrated in particle size distribution and substantially free of abnormally morphological particles.

In the process of preparing the catalyst spherical carrier Z1, there was no clogging phenomenon at the nozzle head of the sprayer, and a total of 11.8 g of the carrier Z1 was obtained.

Example 2

(1) To a 0.6 L reaction kettle, 0.08 mol of magnesium dichloride and 1.4 mol of ethanol (the first alcohol compound) were added, the temperature was raised to 90° C. with stirring, and the contents was allowed to react at that constant temperature for 1.5 h to carry out a first contact, and then shear force was applied to the resulting mixture to afford a first product.

(2) The first product was subjected to a second contact with 0.35 mol of epichlorohydrin to afford a second product, with the conditions for the second contact including a temperature of 90° C. and a time of 30 minute.

(3) After pressure filtration of the second product, the obtained solids were subjected to a third contact by fully mixing and stirring with 2.5 mol of ethanol (the second alcohol compound) and 0.25 mol of 1,3-dichloropropanol (halogenated alcohol) to form a fluid, thereby affording a third product.

(4) With a sprayer B-290 comprising a nozzle head and a material conduit, the third product was sprayed into the circulating nitrogen at 100° C. in the sprayer tower for spray drying to afford a catalyst spherical carrier Z2, with the temperature of the third product in the material conduit being 15° C., and the temperature of the third product in the nozzle head being 120° C.

After testing, the structure and composition of the obtained catalyst spherical carrier Z2 were found as being:

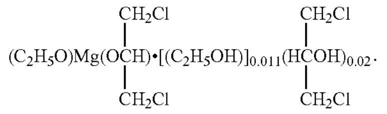

The average particle size (D50) of the catalyst spherical carrier Z2 was tested as 4 microns, and the particle size distribution ((D90–D10)/D50) was tested as 0.8.

It was observed that the particles of the spherical carrier Z2 of catalyst for olefin polymerization are relatively regular in shape and smooth in surface, substantially all of them are of sphere shape, and the spherical carrier Z2 is relatively concentrated in particle size distribution and substantially free of abnormally morphological particles.

In the process of preparing the catalyst spherical carrier Z2, there was no clogging phenomenon at the nozzle head of the sprayer, and a total of 11.9 g of the catalyst spherical carrier Z2 was obtained.

Example 3

(1) To a 0.6 L reaction kettle, 0.08 mol of magnesium dichloride and 1.4 mol of ethanol (the first alcohol compound) were added, the temperature was raised to 90° C. with stirring, and the contents was allowed to react at that constant temperature for 1.5 h to carry out a first contact, and then shear force was applied to the resulting mixture to afford a first product.

(2) The first product was subjected to a second contact with 0.35 mol of epichlorohydrin to afford a second product, with the conditions for the second contact including a temperature of 90° C. and a time of 30 minute.

(3) After pressure filtration of the second product, the obtained solids were subjected to a third contact by combining with 2.5 mol of ethanol (the second alcohol compound) and 0.1 mol of 1,3-dichloropropanol (halogenated alcohol) and stirring to form a fluid, thereby affording a third product.

(4) With a sprayer B-290 comprising a nozzle head and a material conduit, the third product was sprayed into the circulating nitrogen at 100° C. in the sprayer tower for spray drying to afford a spherical carrier Z3, with the temperature of the third product in the material conduit being 15° C., and the temperature of the third product in the nozzle head being 120° C.

After testing, the structure and composition of the obtained catalyst spherical carrier Z3 were found as being:

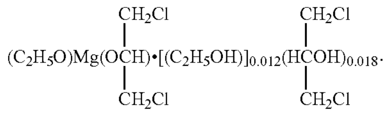

The average particle size (D50) of the catalyst spherical carrier Z3 was tested as 5 microns, and the particle size distribution ((D90–D10)/D50) was tested as 0.8.

It was observed that the particles of the catalyst spherical carrier Z3 are relatively regular in shape and smooth in surface, substantially all of them are of sphere shape, and the catalyst spherical carrier Z3 is relatively concentrated in particle size distribution and substantially free of abnormally morphological particles.

In the process of preparing the catalyst spherical carrier Z3, there was no clogging phenomenon at the nozzle head of the sprayer, and a total of 12.0 g of the catalyst spherical carrier Z3 was obtained.

Example 4

(1) To a 0.6 L reaction kettle, 0.08 mol of magnesium dichloride and 1.4 mol of ethanol (the first alcohol compound) were added, the temperature was raised to 90° C. with stirring, and the contents was allowed to react at that constant temperature for 1.5 h to carry out a first contact, and then shear force was applied to the resulting mixture to afford a first product.

(2) The first product was subjected to a second contact with 0.35 mol of epichlorohydrin to afford a second product, with the conditions for the second contact including a temperature of 90° C. and a time of 30 minute.

(3) After pressure filtration of the second product, the obtained solids were stirred with 2.5 mol of ethanol (the second alcohol compound) and 0.25 mol of 1,3-dichloropropanol (halogenated alcohol) and then sonicated by using an ultrasonic probe for a total of 6 times, 30 min each time, to form a fluid, thereby affording a third product.

(4) With a sprayer B-290 comprising a nozzle head and a material conduit, the third product was sprayed into the circulating nitrogen at 100° C. in the sprayer tower for spray drying to afford a catalyst spherical carrier Z4, with the temperature of the third product in the material conduit being 20° C., and the temperature of the third product in the nozzle head being 120° C.

After testing, the structure and composition of the obtained catalyst spherical carrier Z4 were found as being:

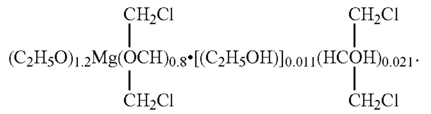

The average particle size (D50) of the catalyst spherical carrier Z4 was tested as 5 microns, and the particle size distribution ((D90–D10)/D50) was tested as 1.0.

It was observed that the particles of the spherical carrier Z4 of catalyst for olefin polymerization are relatively regular in shape and smooth in surface, substantially all of them are of sphere shape, and the spherical carrier Z4 is relatively concentrated in particle size distribution and substantially free of abnormally morphological particles.

In the process of preparing the catalyst spherical carrier Z4, there was no clogging phenomenon at the nozzle head of the sprayer, and a total of 12.4 g of the catalyst spherical carrier Z4 was obtained.

Comparative Example 1

(1) To a 0.6 L reaction kettle, 0.08 mol of magnesium dichloride and 1.4 mol of ethanol were added, the temperature was raised to 90° C. with stirring, and the contents was allowed to react at that constant temperature for 1.5 h. Then, 0.35 mol of epichlorohydrin was added thereto, and the contents was allowed to react at 90° C. for 30 min to afford a fluid mixture.

(2) With a sprayer comprising a nozzle head and a material conduit, the fluid mixture was sprayed into the circulating nitrogen at 100° C. to afford a carrier DZ1 of catalyst for olefin polymerization, with the temperature of the fluid mixture in the material conduit being 90° C. and the temperature of the fluid mixture in the nozzle head being 120° C.

During the spraying process, the fluid mixture from step (1) is easy to precipitate, which is prone to cause the spray drying to be unable to proceed normally, and to cause the blockage of the nozzle.

The average particle size (D50) of the carrier DZ1 of catalyst for olefin polymerization was tested as 15 microns, and the particle size distribution ((D90–D10)/D50) was tested as 1.3.

Comparative Example 2

(1) To a 0.6 L reaction kettle, 0.08 mol of magnesium dichloride and 1.7 mol of ethanol were added, the temperature was raised to 90° C. with stirring, and the contents was allowed to react at that constant temperature for 1 h. Then, 0.48 mol of epichlorohydrin was added thereto, and the contents was allowed to react at 90° C. for 30 minute, to afford a first product.

(2) After pressure filtration of the first product, 2.5 mol of ethanol was added to the solid residues and stirred, to form a fluid mixture.

(3) With a sprayer comprising a nozzle head and a material conduit, the fluid mixture was sprayed into the circulating nitrogen at 100° C. to afford a carrier DZ2 of catalyst for obtain olefin polymerization, with the temperature of the third product in the material conduit being 15° C. and the temperature of the third product in the nozzle head being 120° C.

The average particle size (D50) of the carrier DZ2 of catalyst for obtain olefin polymerization is 3 microns, and the particle size distribution ((D90–D10)/D50) is 0.8.

Comparative Example 3

A catalyst spherical carrier was prepared in the same manner as in Example 1, except that in step (3), no a second alcohol compound was used, and only the halogenated alcohol (1,3-dichloropropanol), the amount of which used is the same as used in Example 1, was fully mixed and stirred with the second product to conduct the third contact, to afford a catalyst carrier DZ3.

In the process of preparing the catalyst carrier DZ3, the carrier was sticky and become agglomerated so that subsequent operations could not be performed.

In working examples, the spherical carriers of catalyst for olefin polymerization provided by the present invention were used to prepare catalysts for olefin polymerization, and the prepared catalysts for olefin polymerization were used to prepare polyolefin.

Working Example 1-1

(1) Preparation of Catalyst for Olefin Polymerization 100 ml of titanium tetrachloride was added to a 300 mL reaction flask and cooled to −20° C. Then, 8 g of the catalyst spherical carrier Z1 from Example 1 was added to the reaction flask, and the contents were stirred at −20° C. for 30 min and then slowly heated to 110° C., with 1.5 ml of diisobutyl phthalate being added thereto during the heating. After maintaining at 110° C. for 30 min, the liquid was filtered off. Then, the residual solids were wished with titanium tetrachloride twice and with hexane thrice and then dried, to give an olefin polymerization catalyst C1.

(2) Propylene Polymerization

Under nitrogen atmosphere, to a 5 L stainless steel autoclave were charged with 1 mmol of triethyl aluminum in hexane (having a triethyl aluminum concentration of 0.5 mmol/mL), 0.05 mmol of methyl cyclohexyl dimethoxy silane, 10 ml of anhydrous hexane, 10 mg of the olefin polymerization catalyst C1 from step (1), 1.5 L (standard volume) of hydrogen gas, and 2.5 L of liquid propylene monomer. The contents were heated to 70° C., and polymerization was allowed to continue at 70° C. for 1 hour. The autoclave was cooled and then the pressure was vented. The resulting polymer was discharged and dried to afford a polypropylene powder.

The catalyst prepared in this Working Example had an activity of 36.1 KgPP/g·Cat; the obtained polypropylene powder had a bulk density of 0.41 $g/cm^3$ and a melt flow rate of 11.9 g/10 min. It was observed that the polypropylene powder was good in particle morphology and was substantially free of abnormally morphological particles. The results are given in Table 1 below.

Working Example 1-2

Polypropylene was prepared in the same manner as in Working Example 1-1, except that in step (2), the volume of hydrogen used was different. Specifically, the 1.5 L (standard volume) of hydrogen was replaced with 6.5 L (standard volume) of hydrogen to afford a polypropylene powder.

The catalyst prepared in this Working Example had an activity of 36.0 KgPP/g·Cat; the obtained polypropylene powder had a bulk density of 0.41 g/$cm^3$ and a melt flow rate of 45.8 g/10 min. It was observed that the polypropylene powder was good in particle morphology and was substantially free of abnormally morphological particles. The results are given in Table 1 below.

Working Example 2-1

Polypropylene was prepared in the same manner as in Working Example 1-1, except that in step (1), the type of catalyst carrier used was different. Specifically, the catalyst spherical carrier Z1 was replaced with the same weight of the catalyst spherical carrier Z2 prepared in Example 2 to afford an olefin polymerization catalyst C2, which was then used to prepare a polypropylene powder according to the procedure described in step (2) of the Working Example 1-1.

The catalyst prepared in this Working Example had an activity of 37.6 KgPP/g·Cat; the obtained polypropylene powder had a bulk density of 0.41 g/$cm^3$ and a melt flow rate of 11.0 g/10 min. It was observed that the polypropylene powder was good in particle morphology and was substantially free of abnormally morphological particles. The results are given in Table 1 below.

Working Example 2-2

Polypropylene was prepared in the same manner as in Working Example 2-1, except that in step (2), the volume of hydrogen used was different. Specifically, the 1.5 L (standard volume) of hydrogen was replaced with 6.5 L (standard volume) of hydrogen to afford a polypropylene powder.

The catalyst prepared in this Working Example had an activity of 37.2 KgPP/g·Cat; the obtained polypropylene powder had a bulk density of 0.41 g/$cm^3$ and a melt flow rate of 41.2 g/10 min. It was observed that the polypropylene powder was good in particle morphology and was substantially free of abnormally morphological particles. The results are given in Table 1 below.

Working Example 3-1

Polypropylene was prepared in the same manner as in Working Example 1-1, except that in step (1), the type of catalyst carrier used was different. Specifically, the catalyst spherical carrier Z1 was replaced with the same weight of the catalyst spherical carrier Z3 prepared in Example 3 to afford an olefin polymerization catalyst C3, which was then used to prepare a polypropylene powder according to the procedure described in step (2) of the Working Example 1-1.

The catalyst prepared in this Working Example had an activity of 38.5 KgPP/g·Cat; the obtained polypropylene powder had a bulk density of 0.41 g/$cm^3$ and a melt flow rate of 10.0 g/10 min. It was observed that the polypropylene powder was good in particle morphology and was substantially free of abnormally morphological particles. The results are given in Table 1 below.

Working Example 3-2

Polypropylene was prepared in the same manner as in Working Example 3-1, except that in step (2), the volume of hydrogen used was different. Specifically, the 1.5 L (standard volume) of hydrogen was replaced with 6.5 L (standard volume) of hydrogen to afford a polypropylene powder.

The catalyst prepared in this Working Example had an activity of 38.2 KgPP/g·Cat; the obtained polypropylene powder had a bulk density of 0.41 g/$cm^3$ and a melt flow rate of 39.0 g/10 min. It was observed that the polypropylene powder was good in particle morphology and was substantially free of abnormally morphological particles. The results are given in Table 1 below.

Comparative Working Example 1

Polypropylene was prepared in the same manner as in Working Example 1-1, except that in step (1), the type of catalyst carrier used was different. Specifically, the catalyst spherical carrier Z1 was replaced with the same weight of the catalyst spherical carrier DZ1 prepared in Comparative Example 1 to afford an olefin polymerization catalyst DC1, which was then used to prepare a polypropylene powder according to the procedure described in step (2) of the Working Example 1-1.

The catalyst prepared in this Working Example had an activity of 34.8 KgPP/g·Cat; the obtained polypropylene powder had a bulk density of 0.37 g/$cm^3$ and a melt flow rate of 9.1 g/10 min. The results are given in Table 1 below.

Comparative Working Example 2-1

Polypropylene was prepared in the same manner as in Working Example 1-1, except that in step (1), the type of catalyst carrier used was different. Specifically, the catalyst spherical carrier Z1 was replaced with the same weight of the catalyst spherical carrier DZ2 prepared in Comparative Example 2 to afford an olefin polymerization catalyst DC2, which was then used to prepare a polypropylene powder according to the procedure described in step (2) of the Working Example 1-1.

The catalyst prepared in this Working Example had an activity of 39.0 KgPP/g·Cat; the obtained polypropylene powder had a bulk density of 0.41 g/$cm^3$ and a melt flow rate of 9.5 g/10 min. The results are given in Table 1 below.

Comparative Working Example 2-2

Polypropylene was prepared in the same manner as in Comparative Working Example 2-1, except that in step (2), the volume of hydrogen used was different. Specifically, the 1.5 L (standard volume) of hydrogen was replaced with 6.5 L (standard volume) of hydrogen to afford a polypropylene powder.

The catalyst prepared in this Working Example had an activity of 37.9 KgPP/g·Cat; the obtained polypropylene powder had a bulk density of 0.41 g/$cm^3$ and a melt flow rate of 37.5 g/10 min. The results are given in Table 1 below.

TABLE 1

| No. | Catalyst | Hydrogen gas amount (L) | Catalyst Activity (kgPP/gcat) | Polymer Bulk Density (g/$cm^3$) | Polymer Melting Index (g/10 min) |
|---|---|---|---|---|---|
| Working Example 1-1 | C1 | 1.5 | 36.1 | 0.41 | 11.9 |
| Working Example 1-2 | | 6.5 | 36.0 | 0.41 | 45.8 |
| Working Example 2-1 | C2 | 1.5 | 37.6 | 0.41 | 11.0 |
| Working Example 2-2 | | 6.5 | 37.2 | 0.41 | 41.2 |

TABLE 1-continued

| No. | Catalyst | Hydrogen gas amount (L) | Catalyst Activity (kgPP/gcat) | Polymer Bulk Density ($g/cm^3$) | Polymer Melting Index (g/10 min) |
|---|---|---|---|---|---|
| Working Example 3-1 | C3 | 1.5 | 38.5 | 0.41 | 10.0 |
| Working Example 3-2 | | 6.5 | 38.2 | 0.41 | 39.0 |
| Comparative Working Example 1 | DC1 | 1.5 | 34.8 | 0.37 | 9.1 |
| Comparative Working Example 2-1 | DC2 | 1.5 | 39.0 | 0.41 | 9.5 |
| Comparative Working Example 2-2 | | 6.5 | 37.9 | 0.41 | 37.5 |

It can be seen from the above results that the carriers of olefin polymerization catalyst prepared by the method of the present invention are good in particle morphology and have substantially no abnormally morphological particles. In addition, the method provided by the present invention can prepare a catalyst carrier with a smaller particle size, thereby greatly expanding the particle size range of the carriers that can be prepared. At the same time, when a catalyst prepared from the obtained carriers is used for an olefin (especially propylene) polymerization, the catalyst has a high activity, gives rise to polypropylene powder with a good particle morphology and being substantially free of abnormally morphological particles, and exhibits a high sensitivity to hydrogen modulation.

In particular, it can be seen from the comparison between Comparative Example 2 and Example 1 that although Comparative Example 2 can obtain a catalyst carrier with a smaller particle size, when the catalyst prepared from the carrier prepared in Comparative Example 2 is used for the olefin polymerization (especially propylene polymerization), the polymer melt index is smaller, and the sensitivity to hydrogen modulation is lower.

The preferred embodiments of the present invention have been described in detail above, but the present invention is not limited thereto. Within the scope of the technical concept of the present invention, a variety of simple modifications can be made to the technical solutions of the present invention, including combining various technical features in any other suitable manner. These simple modifications and combinations should also be regarded as the contents disclosed in the present invention and fall within the protection scope of the present invention.

We claim:

1. A spherical catalyst carrier, comprising a magnesium-containing compound having a structure represented by Formula (1):

Formula (1)

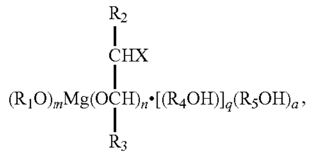

wherein, $R_1$ is a $C_{1-10}$ alkyl;

$R_2$ and $R_3$ are, each independently, selected from the group consisting of H, $C_{1-10}$ alkyl groups, and $C_{1-10}$ alkyl groups substituted by 1 to 10 halogen atoms;

$R_4$ is selected from the group consisting of $C_{1-10}$ alkyl groups substituted by at least one halogen atom and $C_{6-20}$ aryl groups substituted by at least one halogen atom;

$R_5$ is a $C_{1-5}$ alkyl;

X is selected from the group consisting of fluorine, chlorine, bromine, and iodine;

m is 0.1 to 1.9, n is 0.1 to 1.9, and m+n=2; 0<q<0.2; and 0<a<0.1.

2. The spherical catalyst carrier according to claim 1, wherein $R_1$, $R_2$, $R_3$, $R_4$, $R_5$, or X satisfies at least one of definitions selected from the group consisting of:

$R_1$ is a $C_{1-8}$ alkyl;

$R_2$ and $R_3$ are, each independently, selected from the group consisting of H, $C_{1-5}$ alkyl groups, and $C_{1-5}$ alkyl groups substituted by 1 to 10 halogen atoms;

$R_4$ is selected from the group consisting of $C_{1-10}$ alkyl groups substituted by at least two halogen atoms and $C_{6-20}$ aryl groups substituted by at least two halogen atoms;

$R_5$ is a $C_{1-2}$ alkyl; and

X is chlorine or bromine.

3. The spherical catalyst carrier according to claim 1, having an average particle size of from 2 to 100 microns and a particle size distribution of less than 2.

4. The spherical catalyst carrier according to claim 1, wherein $R_1$ is a $C_{1-6}$ alkyl.

5. The spherical catalyst carrier according to claim 1, having an average particle size of from 2 to 19 microns and a particle size distribution of from 0.6 to 1.6.

6. A catalyst comprising the spherical catalyst carrier of claim 1.

7. A process for olefin polymerization, comprising contacting at least one $C_2$-$C_{10}$ olefin monomer and optionally a comonomer with the catalyst of claim 6 under polymerizable conditions to form an olefin polymer, and recovering the olefin polymer.

8. A method for preparing a spherical catalyst carrier, comprising:

(1) subjecting a component A to a first contact and then applying a shear force on a resulting mixture to obtain a first product, the component A comprising a magnesium halide of MgXY and a first alcohol of $R_1OH$;

(2) subjecting the first product and a component B to a second contact to obtain a second product, the component B comprising an oxirane compound of Formula II:

Formula II

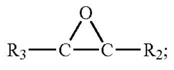

(3) subjecting the second product and a component C to a third contact to obtain a third product, the component C comprising a halogenated alcohol of $R_4OH$ and a second alcohol of $R_5OH$; and (4) spray drying the third product, wherein, $R_1$ is a $C_{1-10}$ alkyl;

$R_2$ and $R_3$ are, each independently, selected from the group consisting of H, $C_{1-10}$ alkyl groups, and $C_{1-10}$ alkyl groups substituted by 1 to 10 halogen atoms;

$R_4$ is selected from the group consisting of $C_{1-10}$ alkyl groups substituted by at least one halogen atom and $C_{6-20}$ aryl groups substituted by at least one halogen atom;

$R_5$ is a $C_{1-5}$ alkyl;

X is selected from the group consisting of fluorine, chlorine, bromine, and iodine; and Y is selected from the group consisting of fluorine, chlorine, bromine, iodine, $C_{1-6}$ alkyl, $C_{1-6}$ alkoxy, $C_{6-14}$ aryl, and $C_{6-14}$ aryloxy;

and the component A, the component B and the component C used are such that the resulting spherical catalyst carrier comprises a magnesium-containing compound having a structure represented by Formula I:

Formula I

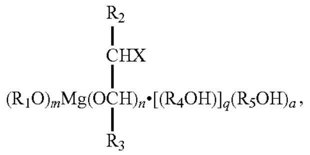

wherein, m is 0.1 to 1.9, n is 0.1 to 1.9, and m+n=2; 0<q<0.2; 0<a<0.1; and wherein, in step (3), an amount of the halogenated alcohol used is from 0.05 to 6.5 mol, and an amount of the second alcohol used is from 5 to 100 mol, relative to 1 mole of the magnesium halide used.

9. The method according to claim 8, satisfying at least one of conditions selected from:

in MgXY, X is chlorine or bromine, and Y is selected from the group consisting of chlorine, bromine, $C_{1-5}$ alkyl, $C_{1-5}$ alkoxy, $C_{6-10}$ aryl, and $C_{6-10}$ aryloxy;

MgXY is at least one selected from the group consisting of magnesium chloride, magnesium bromide, phenoxymagnesium chloride, isopropoxymagnesium chloride and n-butoxymagnesium chloride;

$R_1$ is a $C_{1-8}$ alkyl;

$R_1OH$ is at least one selected from the group consisting of ethanol, n-propanol, isopropanol, n-butanol, isobutanol, n-pentanol, isopentanol, n-hexanol, n-octanol, and 2-ethylhexanol;

in Formula II, $R_2$ and $R_3$ are, each independently, selected from the group consisting of H, $C_{1-5}$ alkyl, and $C_{1-5}$ alkyl substituted by 1 to 10 halogen atoms;

the oxirane compound is at least one selected from the group consisting of ethylene oxide, propylene oxide, butylene oxide, epichlorohydrin, epoxy chlorobutane, epoxy bromopropane, and epoxy bromobutane;

in_$R_4OH$, $R_4$ is selected from the group consisting of $C_{1-10}$ alkyl groups substituted by at least two halogen atoms and $C_{6-20}$ aryl groups substituted by at least two halogen atoms;

the halogenated alcohol is at least one selected from the group consisting of 2,2,2-trichloroethanol, 2,2-dichloroethanol, 1,2-dichloroethanol, 1,3-dichloropropanol, and 1,4-dichlorobutanol;

in $R_5OH$, $R_5$ is a $C_{1-2}$ alkyl;

relative to 1 mole of the magnesium halide used, an amount of the first alcohol used is from 6 to 22 moles, an amount of the oxirane-type compound used is from 2 to 6 moles, the amount of the halogenated alcohol used is from 1 to 5 moles, and the amount of the second alcohol compound used is from 8 to 80 moles;

in step (1), the first contact is performed under stirring at a temperature of from 80 to 120° C. for 0.5 to 5 h;

in step (1), the first contact is carried out at a temperature of from 80 to 100° C. for 0.5 to 3 h;

in step (2), the second contact is carried out at a temperature of from 50 to 120° C. for 20 to 60 min;

in step (2), the second contact is carried out a temperature of from 80 to 100° C. for 20 to 50 min;

in step (3), the third contact is carried out under stirring at a temperature of from 0 to 120° C. for 0.5 to 6 hours; and in step (4), the spray drying is carried out at a temperature of from 60 to 200° C.

10. The spherical catalyst carrier prepared by the method according to claim 8.

11. A catalyst comprising the spherical catalyst carrier of claim 10.

12. A process for olefin polymerization, comprising contacting at least one $C_2$-$C_{10}$ olefin monomer and optionally a comonomer with the catalyst of claim 11 under polymerizable conditions to form an olefin polymer, and recovering the olefin polymer.

* * * * *